United States Patent
Kim (10) Patent No.: US 10,996,807 B2
(45) Date of Patent: May 4, 2021

(54) TOUCH SENSOR WITH MODULAR SHAPE AND DISPLAY DEVICE INCLUDING THE SAME

(71) Applicant: KOREA UNIVERSITY RESEARCH AND BUSINESS FOUNDATION, Seoul (KR)

(72) Inventor: Chulwoo Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/776,688

(22) Filed: Jan. 30, 2020

(65) Prior Publication Data
US 2020/0371643 A1 Nov. 26, 2020

(30) Foreign Application Priority Data
May 24, 2019 (KR) .......... 10-2019-0060921
Dec. 27, 2019 (KR) .......... 10-2019-0176955

(51) Int. Cl.
G06F 3/041 (2006.01)
G06F 3/044 (2006.01)

(52) U.S. Cl.
CPC .......... G06F 3/0448 (2019.05); G06F 3/0416 (2013.01); G06F 3/0445 (2019.05); G06F 3/0446 (2019.05)

(58) Field of Classification Search
CPC ....... B60N 2/002; G06F 3/041; G06F 3/0416; G06F 3/044; G06F 3/0445; G06F 3/0446; G06F 3/0448; G06F 3/046; G06F 2203/04106; G06K 9/0002
See application file for complete search history.

(56) References Cited

U.S. PATENT DOCUMENTS

| | | | | |
|---|---|---|---|---|
| 5,802,479 A | * | 9/1998 | Kithil | B60N 2/002 257/295 |
| 7,202,859 B1 | * | 4/2007 | Speck | G06F 3/044 345/174 |
| 2006/0152497 A1 | * | 7/2006 | Rekimoto | G06F 1/1616 345/173 |
| 2006/0227117 A1 | * | 10/2006 | Proctor | G06F 3/03547 345/173 |
| 2007/0139049 A1 | * | 6/2007 | Van Berkel | G06K 9/0002 324/452 |

(Continued)

FOREIGN PATENT DOCUMENTS

KR 10-2014-0054092 A 5/2014

OTHER PUBLICATIONS

Korean Office Action dated Jan. 15, 2021 in corresponding Korean Patent Application No. 10-2019-0176955. (4 pages in Korean).

Primary Examiner — Michael J Eurice
(74) Attorney, Agent, or Firm — NSIP Law (57) ABSTRACT

A display device includes a first touch panel on which a first touch sensing unit including a plurality of coils is disposed, a second touch panel on which a second touch sensing unit including a plurality of sensing nodes coupled to the plurality of coils in a coupling manner with a one-to-one correspondence, and a display panel disposed between the first and second touch panels and displays an image, and the plurality of sensing nodes is formed in a divided structure grouped into first and second node groups based on a touch event detected by the first touch sensing unit.

20 Claims, 10 Drawing Sheets

(56) References Cited

U.S. PATENT DOCUMENTS

| | | | |
|---|---|---|---|
| 2010/0321315 A1* | 12/2010 | Oda | G06F 3/046 345/173 |
| 2010/0321334 A1* | 12/2010 | Oda | G06F 3/044 345/174 |
| 2010/0328208 A1* | 12/2010 | Austin | G06F 3/044 345/157 |
| 2011/0153263 A1* | 6/2011 | Oda | G06F 3/0445 702/150 |
| 2012/0327012 A1* | 12/2012 | Hoch | G06F 3/044 345/174 |
| 2013/0041622 A1* | 2/2013 | Lu | G01M 1/00 702/151 |
| 2014/0022202 A1* | 1/2014 | Badaye | G06F 3/0445 345/174 |
| 2014/0238153 A1* | 8/2014 | Wood | G06F 3/011 73/862.627 |
| 2014/0267154 A1* | 9/2014 | Yamaguchi | G06F 3/044 345/174 |
| 2015/0035549 A1* | 2/2015 | Sugiura | G01D 5/2405 324/663 |
| 2015/0177298 A1* | 6/2015 | Sugiura | G06F 3/044 324/658 |
| 2015/0234498 A1* | 8/2015 | Cho | G06F 3/0446 345/174 |
| 2015/0277621 A1* | 10/2015 | Roberson | G06F 3/044 345/174 |
| 2015/0378491 A1* | 12/2015 | Worfolk | G06F 3/0416 345/174 |
| 2016/0154511 A1* | 6/2016 | Yao | G06F 3/0416 345/174 |
| 2016/0202826 A1* | 7/2016 | Han | G06F 3/0416 345/174 |
| 2017/0031480 A1* | 2/2017 | Gabriel | F24C 7/086 |
| 2017/0300735 A1* | 10/2017 | Li | G06F 21/32 |
| 2018/0067590 A1 | 3/2018 | Wang et al. | |
| 2018/0150170 A1* | 5/2018 | Oh | H01L 51/0097 |
| 2019/0050097 A1* | 2/2019 | Mugiraneza | G06F 3/0446 |
| 2019/0064966 A1* | 2/2019 | Kim | G06F 3/044 |
| 2019/0286281 A1* | 9/2019 | Aoki | G06F 3/041 |
| 2019/0384453 A1* | 12/2019 | Tanemura | G06F 3/0446 |
| 2020/0153432 A1* | 5/2020 | Wu | H03K 17/98 |
| 2020/0183564 A1* | 6/2020 | Song | G06F 3/04166 |
| 2020/0249835 A1* | 8/2020 | Ueno | G06F 3/0486 |

\* cited by examiner

TOUCH SENSOR WITH MODULAR SHAPE AND DISPLAY DEVICE INCLUDING THE SAME

CROSS-REFERENCE TO RELATED APPLICATIONS

The present application is based upon and claims the benefit of priority to Korean Patent Application No. 10-2019-0060921 filed on May 24, 2019 and Korean Patent Application No. 10-2019-0176955 filed on Dec. 27, 2019. The disclosures of the above-listed applications are hereby incorporated by reference herein in their entirety.

BACKGROUND

Embodiments of the inventive concept described herein relate to a touch sensor with a modular shape and a display device including the same.

In general, a touch panel in which a user touches a screen with a hand or a pen to input information is used for an input device such as a personal computer, a portable communication device, or other personal information processing devices.

The touch panel is simple, less malfunction, easy to carry, capable of entering a text without any other input device, and easy for the user to recognize how to use, thereby being applied to various information processing devices. For example, the touch panel may be classified into an ultrasonic type, an electrostatic capacitive type, a resistive type, an electromagnetic type, an optical sensor type, and the like based on a method of sensing a part touched by the user.

The touch panel is generally provided with a touch sensor in which a heterogeneous coupling, such as, IC or FPCB bonding, interfering with touch is not provided on a touched surface. In particular, it is common not to mount a structure of a touch sensor which is not visually uniform to stand out or covers pixels in a display area of the touch panel.

Therefore, because a capacitive touch sensor mainly used as the touch screen is required to be wired with IC, a touch screen may be configured as a screen divided into up to four touch units (horizontally divided by two, vertically divided by two). Accordingly, a size of one touch unit is limited due to cut-off frequency and noise, and thus an overall size of the touch panel including the four touch units is also limited.

SUMMARY

Embodiments of the inventive concept provide a touch sensor with a modular form which enables driving and sensing for a size of the touch panel in which the driving and the sensing are not possible with a single touch unit, and a display device including the same.

According to an exemplary embodiment, a touch sensor includes a first touch sensing unit including a plurality of coils arranged in first and second directions and a second touch sensing unit including a plurality of sensing nodes arranged in the first and second directions such that each of the plurality of sensing nodes couples each of the plurality of coils in a coupling manner, and the first and second sensing units are disposed on different layers.

In an embodiment, the plurality of sensing nodes are formed in a divided structure which is grouped into first and second node groups based on a touch event detected by the first touch sensing unit.

In an embodiment, the first and second node groups include first and second arrangement connected to each other by at least one first wire corresponding to the first direction and each of the first and second arrangement includes at least one sensing node connected to each other by at least one second wire corresponding to the second direction and the remaining sensing nodes not connected to each other by the at least one second wire.

In an embodiment, the second touch sensing unit includes at least one first wire extending in the first direction and formed in a rod shape, at least one second wire extending in the second direction and formed in the rod shape, and at least one sensing node arranged for each arrangement region where the at least one first and second wires cross each other.

In an embodiment, the second touch sensing unit includes at least one first wire in which at least one first sub-coil is disposed at a specific distance spaced apart from each other in the first direction, at least one second wire in which at least one second sub-coil is disposed a specific distance spaced apart from each other in the second direction, and at least one sensing node arranged for each second arrangement region formed by a pair of first sub-coils of the at least one first sub-coil and a pair of second sub-coils of the at least one second sub-coil, and the second arrangement region corresponds to an outer region of the at least one of first and second wires.

In an embodiment, the second touch sensing unit includes at least one first wire in which at least one first sub-coil is disposed at a specific distance spaced apart from each other in the first direction, at least one second wire in which at least one second sub-coil is disposed a specific distance spaced apart from each other in the second direction, and at least one sensing node arranged for each third arrangement region formed by a pair of first sub-coils of the at least one first sub-coil and a pair of second sub-coils of the at least one second sub-coil, and the third arrangement region corresponds to an region where the at least one first wire and the one second wire cross each other and overlap each other.

In an embodiment, the second touch sensing unit includes at least one first wire extending in the first direction, at least one second wire extending in the second direction, at least one capacitor having one side connected to the at least one first wire and the other side connected to the at least one second wire, and at least one sensing node disposed in the capacitor.

In an embodiment, the number of capacitors corresponds to the number of at least one sensing node.

In an embodiment, the second touch sensing unit includes at least one first wire extending in the first direction, at least one second wire extending in the second direction, at least one transistor having a gate connected to the at least one first wire, and one of a source and a drain connected to the at least one second wire, and at least one sensing node connected for another one of the source and the drain of the transistor.

In an embodiment, the number of the at least one transistor corresponds to the number of the at least one sensing node.

In an embodiment, the second touch sensing unit includes at least one first wire extending in the first direction, at least one second wire extending in the second direction, at least one switch having one side connected to one of the at least one of first and second wires through switching, and at least one sensing node connected to the other side of the at least one switch.

In an embodiment, the number of the at least one switch corresponds to the number of the at least one sensing node.

In an embodiment, the at least one switch alternately connects the at least one sensing node to the at least one first wire and the at least one second wire through switching.

According to an exemplary embodiment, a display device includes a first touch panel on which a first touch sensing unit including a plurality of coils is disposed, a second touch panel on which a second touch sensing unit including a plurality of sensing nodes such that each of the plurality of sensing nodes couples each of the plurality of coils in a coupling manner, and a display panel disposed between the first and second touch panels and configured to display an image, and the plurality of sensing nodes is formed in a divided structure grouped into first and second node groups based on a touch event detected by the first touch sensing unit.

In an embodiment, the second touch panel is a panel stacked below the display panel and the first touch panel is a panel stacked above the display panel.

In an embodiment, the plurality of coils are arranged on one surface of the first touch panel in first and second directions and the plurality of sensing nodes are arranged on one surface of the second touch panel in the first and second directions.

In an embodiment, the first and second node groups include first and second arrangements connected to each other by at least one first wire corresponding to the first direction and each of the first and second arrangements includes at least one sensing node connected to each other by at least one second wire corresponding to the second direction and the remaining sensing nodes not connected to each other by the at least one second wire.

In an embodiment, the display device further include a touch circuit connected from the plurality of sensing nodes through the at least one of the first and second wires and the touch circuit is disposed on the same surface as the second touch panel.

In an embodiment, the touch circuit includes a selector configured to select at least two node groups based on the touch event detected by the first touch sensing unit, a driver configured to transmit a driving signal to the at least two node groups, and a detector configured to detect a sensing signal from the at least two node groups.

In an embodiment, the touch circuit further includes an amplifier that amplifies the sensing signal transmitted from the plurality of sensing nodes through the first and second wires in a linear or nonlinear manner to transmit an amplified signal to the sensor, and the amplifier includes at least one of a buffer, an amplifier, a single-ended amplifier, and a transistor.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Specific structural or functional descriptions of embodiments according to the inventive concept disclosed herein are only illustrated for the purpose of describing embodiments according to the inventive concept. The embodiments according to the inventive concept may be implemented in various forms and are not limited to the embodiments described herein.

Embodiments according to the inventive concept may make various modifications and may have various forms. Accordingly, the embodiments will be illustrated in the drawings and described in detail herein. However, this is not intended to limit the embodiments in accordance with the inventive concept to specific disclosure forms, but includes all changes, equivalents, or substitutes included in the spirit and scope of the inventive concept.

Terms such as first or second may be used to describe various components, but the components should not be limited by the terms. The terms are only for the purpose of distinguishing one component from another, for example, without departing from the scope of the rights in accordance with the inventive concept, the first component may be called a second component, and similarly the second component may also be referred to as the first component.

When a component is said to be "connected" or "accessed" to another component, it may be understood that while other components may be directly connected or accessed, there may be other components in between. On the other hand, when a component is said to be "directly connected" or "directly accessed" to another component, it should be understood that there is no other component in between. Other expressions describing the relationship between components, such as "between" and "immediately between," or "neighboring to," and "directly neighboring to" should be interpreted as well.

The terminology used herein is for the purpose of describing particular embodiments only and is not intended to be limiting of the inventive concept. Singular expressions include plural expressions unless the context clearly indicates otherwise. In this specification, terms such as "comprise" or "have" are intended to indicate that there is a feature, number, step, action, component, part, or combination thereof implemented, and it should be understood that it does not exclude in advance the possibility of the presence or addition of one or more other features or numbers, steps, operations, components, parts or combinations thereof.

Unless defined otherwise, all terms used herein, including technical or scientific terms, have the same meaning as commonly understood by one of ordinary skill in the art to which this application belongs. Terms such as those defined in the commonly used dictionaries should be interpreted as having meanings consistent with the meanings in the context of the related art, and are not interpreted in ideal or excessively formal meanings unless expressly defined herein.

Figure 1:
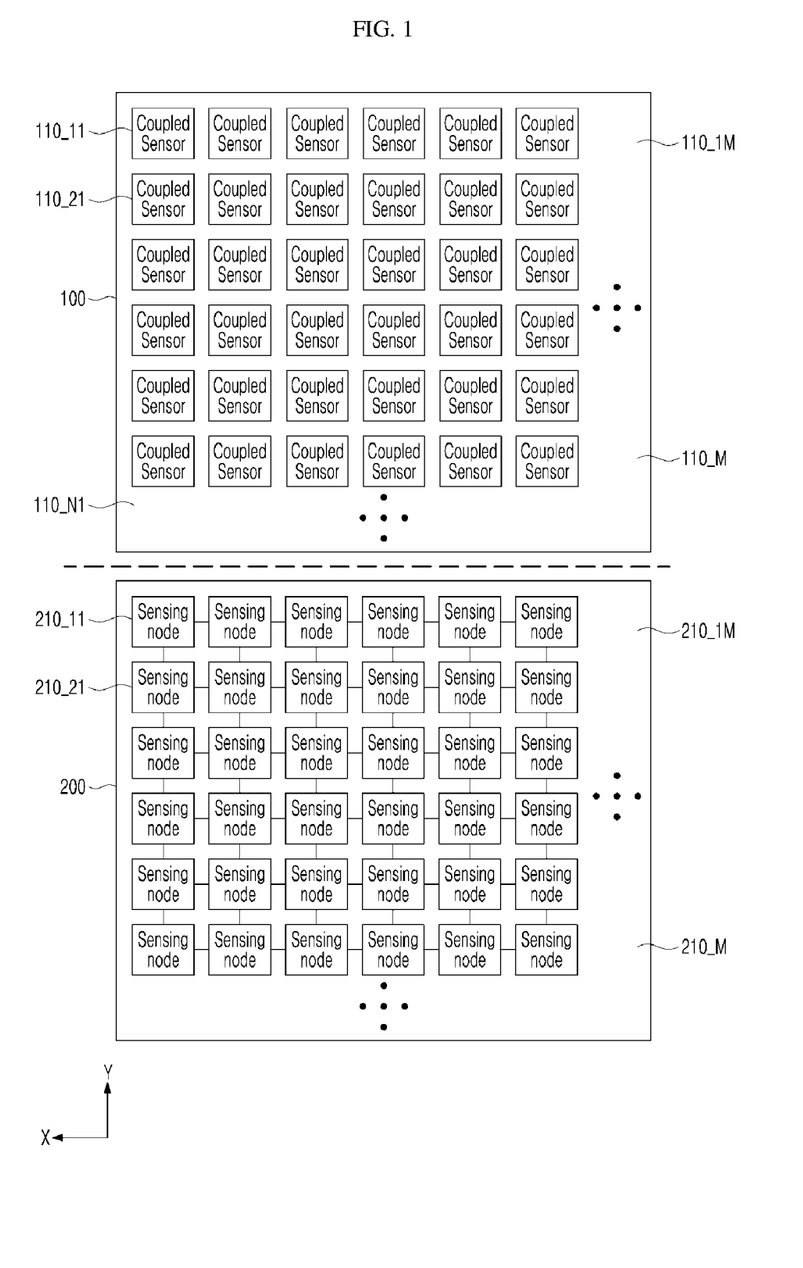
FIG. 1 is a view illustrating a touch sensor according to an embodiment of the inventive concept.
Figure 2A:
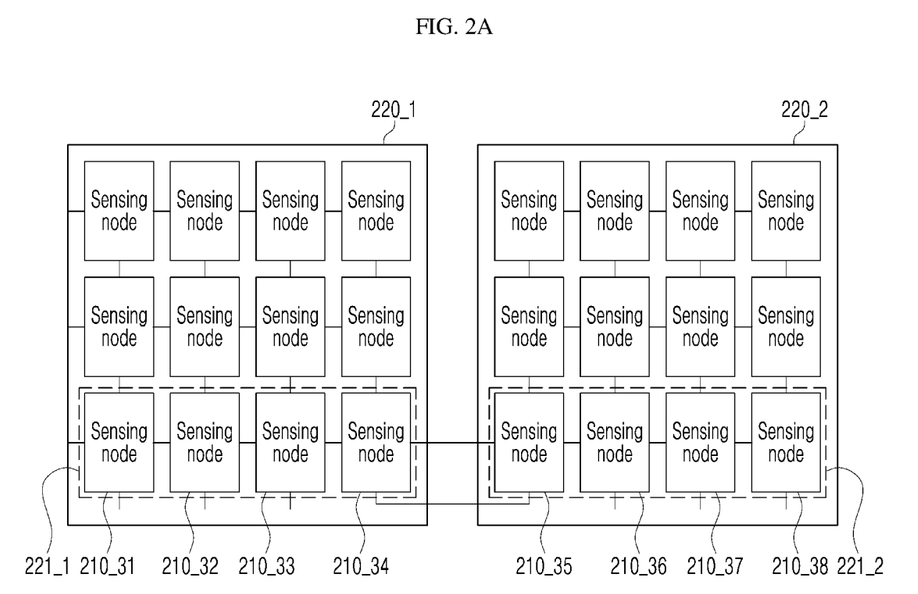
FIG. 2A is a view explaining first and second node groups of FIG. 1.
Figure 2B:
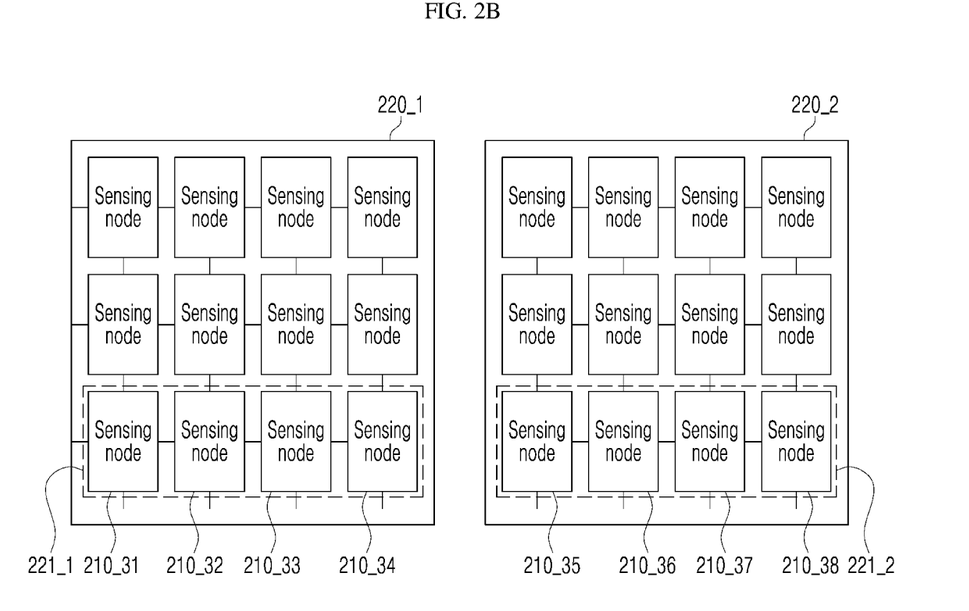
FIG. 2B is a view explaining a second touch sensing unit of FIG. 1.

FIG. 1 is a view illustrating a touch sensor 10 according to an embodiment of the inventive concept, FIG. 2A is a view explaining first and second node groups 220_1 and 220_2 of FIG. 1, and FIG. 2B is a view explaining a divided structure of a second touch sensing unit 200 of FIG. 1.

Referring to FIG. 1, the touch sensor 10 may include first and second touch sensing units 100 and 200.

First, the first touch sensing unit 100 may include a plurality of coils 110_11 to 110_NM arranged in first and second directions. Here, the first direction may correspond to a horizontal direction (an X-axis direction) and the second direction may correspond to a vertical direction (a Y-axis direction).

In detail, the plurality of coils 110_11 to 110_NM may be arranged at positions spaced apart from each other by a specific distance in the first and second directions on one side of the first touch sensing unit 100 and may detect a touch event position which is generated by a user touch. For example, the plurality of coils 110_11 to 110_NM may be an inductive touch sensor. Here, the first touch sensing unit 100 may measure a mutual capacitance changed by the user touch and calculate a coordinate of the changed point as a touched portion.

Next, the second touch sensing unit 200 may include a plurality of sensing nodes 210_11 to 210_NM arranged in the first and second directions to wirelessly couple the coils 110_11 to 110_NM in a coupling manner with a one-to-one correspondence. Here, the plurality of sensing nodes 210_11 to 210_NM may be disposed at positions spaced apart from each other by a specific distance in the first and second directions.

In this case, the first and second touch sensing units 100 and 200 may be disposed on different layers. That is, the plurality of coils 110_11 to 110_NM and the plurality of sensing nodes 210_11 to 210_NM may be disposed on different layers.

In detail, the plurality of sensing nodes 210_11 to 210_NM may be grouped into at least two node groups based on the touch event detected by the first touch sensing unit 100. Here, each of the at least two node groups 220_1 and 220_2 may have a modular form manufactured as a unit. For example, as illustrated in FIG. 2A, the plurality of sensing nodes 210_11 to 210_NM may be formed in a divided structure which is grouped into the first and second node groups 220_1 and 220_2 based on the touch event detected by the first touch sensing unit 100.

Here, the first and second node groups 220_1 and 220_2 may include first and second arrays 221_1 and 221_2 connected to each other in the first direction, respectively. For example, the first node group 220_1 may include the first array 221_1, and the second node group 220_2 may include the second array 221_2.

In detail, the first array 221_1 may include at least one sensing node (e.g., 210_34) connected to the second array 221_2 in the second direction and remaining sensing nodes (e.g., 210_31 to 210_33) not connected to each other in the second direction. In addition, the second array 221_2 may include at least one sensing node (e.g., 210_35) connected to each other in the second direction and remaining sensing nodes (e.g., 210_36 to 210_38) not connected to each other in the second direction.

As shown in FIG. 2B, the second touch sensing unit 200 may be formed in a divided structure which is grouped into the at least two node groups 220_1 and 220_2 based on the touch event detected by the first touch sensing unit 100. The second touch sensing unit 200 may include the first and second node groups 220_1 and 220_2 connected in the second direction between the at least one sensing node (e.g., 210_34) of the first array 221_1 and the at least one sensing node (e.g., 210_35) of the second array 221_2.

The touch sensor 10 according to the embodiment of the inventive concept is grouped into each node groups (e.g., 220_1, 220_2) to be manufactured in the unit of the module form, and thus sensing and driving limit problems caused by increase in a size of the touch panel may be reduced, a manufacturing yield may be increased, and a manufacturing cost may be reduced.

Figure 3:
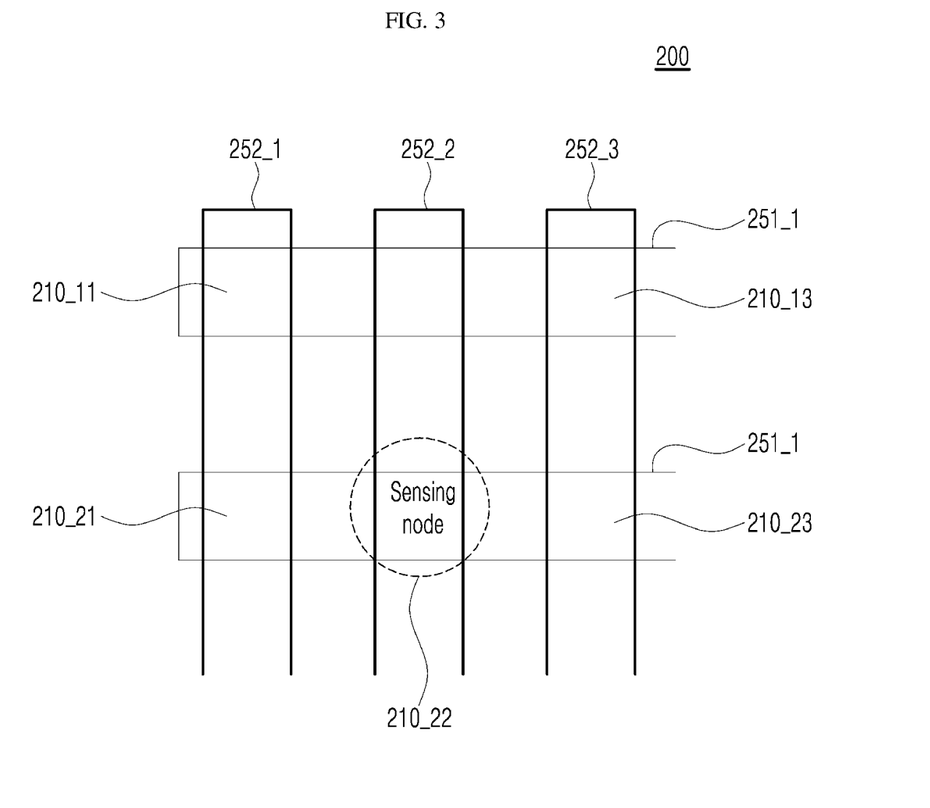
FIG. 3 is a view illustrating a second touch sensing unit of FIG. 1 according to another embodiment in detail.

FIG. 3 is a view illustrating the second touch sensing unit 200 of FIG. 1 according to an embodiment in detail.

Referring to FIG. 3, the second touch sensing unit 200 may include at least one of first and second wires 251_1 to 251_N, and 252_1 to 252_M, and at least one of sensing nodes 210_11 to 210_NM. At least one of the first and second wires 251_1 to 251_N and 252_1 to 252_M and at least one of the sensing nodes 210_11 to 210_NM may be disposed on one surface of the second touch sensing unit 200 facing the first touch sensing unit 100.

In detail, at least one of the first wires 251_1 to 251_N may be formed in a rod shape, extend in the first direction, and be arranged in plurality in parallel to the second direction. Next, at least one of the second wires 252_1 to 252_M may be formed in the same rod shape as at least one of the first wires 251_1 to 251_N, extend in the second direction, and be arranged in plurality in parallel to the first direction.

Here, at least one of the first wires 251_1 to 251_N may correspond to the first direction, and at least one of the second wires 252_1 to 252_M may correspond to the second direction. In this case, at least one of the first and second wires 251_1 to 251_N and 252_1 to 252_M may be formed to have a structure perpendicular to each other.

In the inventive concept, the rod shape may mean a shape including a pair of horizontal lines in parallel and one vertical line connecting the pair of horizontal lines.

At least one of the sensing nodes 210_11 to 210_NM according to the embodiment may be disposed for each of first arrangement regions where at least one of the first and second wires 251_1 to 251_N and 252_1 to 252_M cross each other. Here, each of the first arrangement regions may be a region where at least one of the first and second wires 251_1 to 251_N and 252_1 to 252M cross each other to overlap each other and may be formed at positions spaced apart at a specific distance in the first and second directions. In this case, the number of first arrangement regions may correspond to the number of at least one of the sensing nodes 210_11 to 210_NM.

Figure 4:
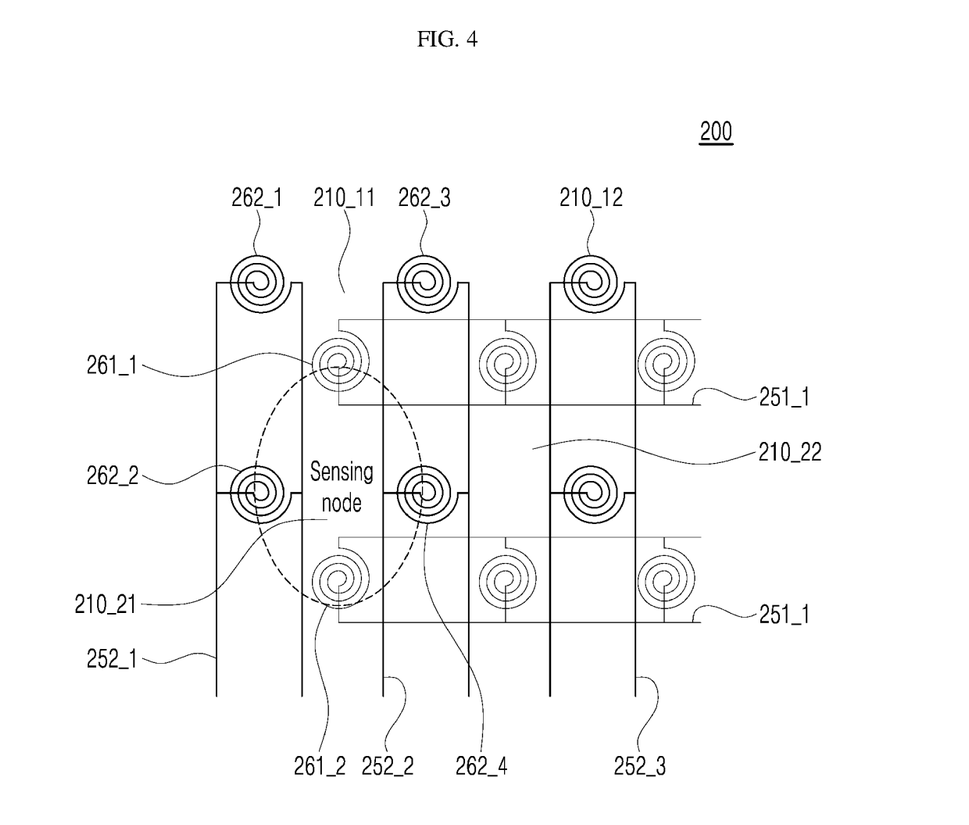
FIG. 4 is a view illustrating a second touch sensing unit of FIG. 1 according to still another embodiment in detail.

FIG. 4 is a view illustrating the second touch sensing unit 200 of FIG. 1 according to another embodiment in detail.

Referring to FIG. 4, the second touch sensing unit 200 may include at least one of the first and second wires 251_1 to 251_N and 252_1 to 252_M, and at least one of the sensing nodes 210_11 to 210_NM. At least one of the first and second wires 251_1 to 251_N and 252_1 to 252_M and at least one of the sensing nodes 210_11 to 210_NM may be disposed on one surface of the second touch sensing unit 200 facing the first touch sensing unit 100.

In detail, at least one of the first wires 251_1 to 251_N may be formed in the rod shape, extend in the first direction, and be arranged in plurality in parallel to the second direction. Next, at least one of the second wires 252_1 to 252_M may be formed in the same rod shape as at least one of the first wires 251_1 to 251_N, extend in the second direction, and be arranged in plurality in parallel to the first direction.

Here, at least one of the first wires 251_1 to 251_N may correspond to the first direction, and at least one of the second wires 252_1 to 252_M may correspond to the second direction. In this case, some of at least one of the first and second wires 251_1 to 251_N and 252_1 to 252_M may be formed to have a structure perpendicular to each other and the others may be formed in a structure which is not perpendicular to each other.

In addition, at least one of first sub-coils 261_1 to 261_N may be disposed at positions spaced apart from each other in the first direction by a specific distance in at least one of the first wires 251_1 to 251_N. In addition, second sub-coils 262_2 to 262_N may be disposed at positions spaced apart from each other in the second direction by a specific distance in at least one of the second wires 252_1 to 252_M.

At least one of the sensing nodes 210_11 to 210_NM according to an embodiment may be disposed for each of second arrangement regions which is formed between a first pair of coils (e.g., 261_1 and 261_2) of the first sub-coils 261_1 to 261_N and a second pair of coils 262_2 and 262_4 of the second sub-coils 262_2 to 262_N. Here, each of the second arrangement regions may be a virtual radially inner region formed by the first pair of coils (e.g., 261_1 and 261_2) and the second pair of coils 262_2 and 262_4. The central portion of the virtual radius may be an outer region of at least one of the first and second wires 251_1 to 251_N and 252_1 to 252_M. In this case, the number of the second arrangement regions may correspond to the number of at least one of the sensing nodes 210_11 to 210_NM.

Figure 5:
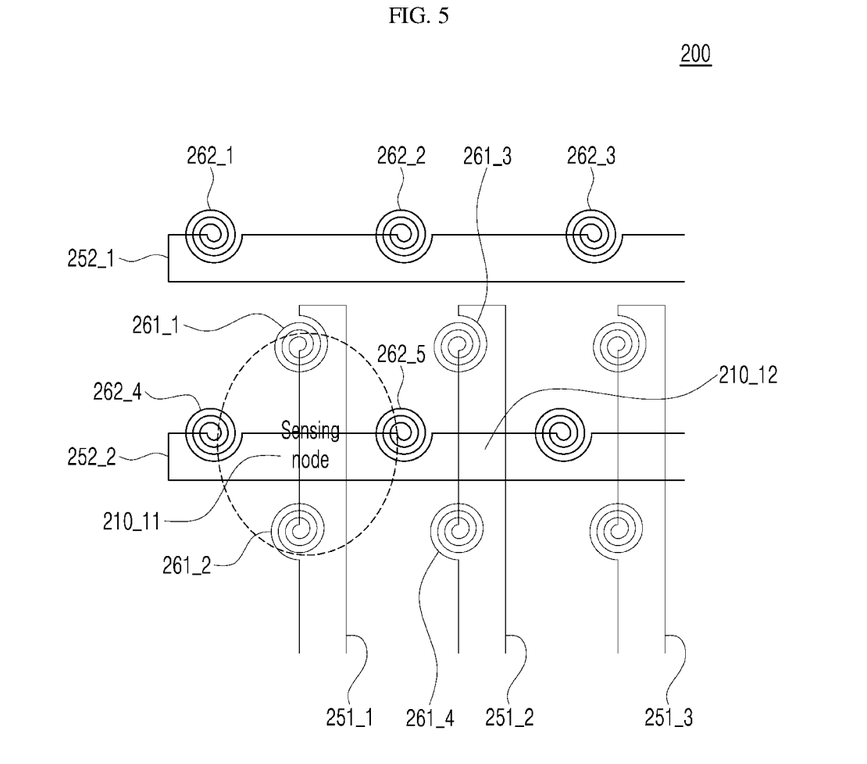
FIG. 5 is a view illustrating a second touch sensing unit of FIG. 1 according to still another embodiment in detail.

FIG. 5 is a view illustrating the second touch sensing unit 200 of FIG. 1 according to still another embodiment in detail.

Referring to FIG. 5, the second touch sensing unit 200 may include at least one of the first and second wires 251_1 to 251_N and 252_1 to 252_M, and at least one of the sensing nodes 210_11 to 210_NM. At least one of the first and second wires 251_1 to 251_N and 252_1 to 252_M and at least one of the sensing nodes 210_11 to 210_NM may be disposed on one surface of the second touch sensing unit 200 facing the first touch sensing unit 100.

In detail, at least one of the first wires 251_1 to 251_N may be formed in the rod shape, extend in the first direction, and be arranged in plurality in parallel to the second direction. Next, at least one of the second wires 252_1 to 252_M may be formed in the same rod shape as at least one of the first wires 251_1 to 251_N, extend in the second direction, and be arranged in plurality in parallel to the first direction.

Here, at least one of the first wires 251_1 to 251_N may correspond to the first direction, and at least one of the second wires 252_1 to 252_M may correspond to the second direction. In this case, at least one of the first wires 251_1 to 251_N and one second wire (e.g., 252_2) of at least one of the second wires 252_1 to 252_M may be formed to have a structure perpendicular to each other. Furthermore, some of the others of at least one of the second wires 252_1 to 252_M and at least one of the first wires 251_1 to 251_N may be formed in a structure which is not perpendicular to each other.

In addition, the at least one of first sub-coils 261_1 to 261_N may be disposed at positions spaced apart from each other in the first direction by a specific distance in at least one of the first wires 251_1 to 251_N. In addition, the second sub-coils 262_2 to 262_N may be disposed at positions spaced apart from each other in the second direction by a specific distance in at least one of the second wires 252_1 to 252_M.

At least one of the sensing nodes 210_11 to 210_NM according to an embodiment may be disposed for each of third arrangement regions which is formed between the first pair of coils 261_1 and 261_2 of the first sub-coils 261_1 to 261_N and second pair of coils 262_4 and 262_5 of the second sub-coils 262_2 to 262_N. Here, each of the third arrangement regions may be a virtual radially inner region formed by the first pair of coils 261_1 and 261_2 and the second pair of coils 262_4 and 262_5. The central portion of the virtual radius may be an overlapping region where at least one of the first and second wires 251_1 to 251_N and 252_1 to 252_M cross each other. In this case, the number of the third arrangement regions may correspond to the number of at least one of the sensing nodes 210_11 to 210_NM.

According to another embodiment, the second touch sensing unit 200 may include at least one of the first sub-coils 261_1 to 261_N, at least one of the second sub-coils 262_2 to 262_N, and at least one of the sensing nodes 210_11 to 210_NM.

In detail, at least one of the first sub-coils 261_1 to 261_N may be formed at positions spaced at a specific distance in the first direction and at least one of the second sub-coil 262_2 to 262_N may be adjacent to at least one of the first sub-coils 261_1 to 261_N and may be formed at positions spaced at a specific distance in the second direction. Here, at least one of the sensing nodes 210_11 to 210_NM may be arranged between at least one of the first sub-coils 261_1 to 261_N and at least one of the second sub-coils 262_2 to 262_N.

Figure 6:
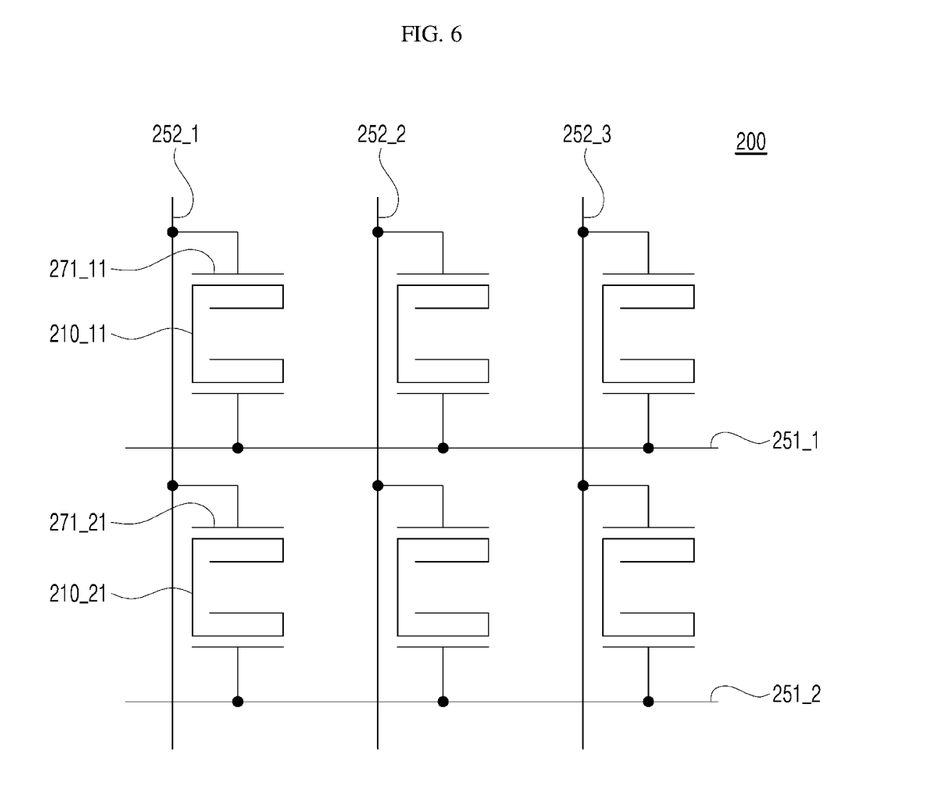
FIG. 6 is a view illustrating a second touch sensing unit of FIG. 1 according to still another embodiment in detail.

FIG. 6 is a view illustrating the second touch sensing unit 200 of FIG. 1 according to still another embodiment in detail.

Referring to FIG. 6, the second touch sensing unit 200 may include the at least one of first and second wires 251_1 to 251_N, 252_1 to 252_M, at least one of capacitors 271_11 to 271_NM, and at least one of the sensing nodes 210_11 to 210_NM. At least one of the first and second wires 251_1 to 251_N and 252_1 to 252_M, at least one of the capacitors 271_11 to 271_NM, and at least one of the sensing node 210_11 to 210_NM may be disposed on one surface of the second touch sensing unit 200 facing the first touch sensing unit 100.

In detail, at least one of the first wires 251_1 to 251_N may extend in the first direction and may be arranged in plurality in parallel to the second direction. Next, at least one of the second wires 252_1 to 252_M may extend in the second direction and may be arranged in plurality in parallel to the first direction.

Here, at least one of the first wires 251_1 to 251_N may correspond to the first direction and at least one of the second wires 252_1 to 252_M may correspond to the second direction. In this case, at least one of the first wires 251_1 to 251_N and one second wire (e.g., 252_2) of at least one of the second wires 252_1 to 252_M may be formed to have a structure perpendicular to each other.

Next, at least one of the capacitors 271_11 to 271_NM may have one side connected to at least one of the first wires 251_1 to 251_N and the other side connected to at least one of the second wires 252_1 to 252_M. In this case, at least one of the capacitors 271_11 to 271_NM may be connected to at least one of the first wires 251_1 to 251_N, respectively, and may be disposed at a specific distance spaced apart in the first and second directions.

At least one of the sensing nodes 210_11 to 210_NM according to an embodiment may be disposed inside at least one of the capacitors 271_11 to 271_NM. For example, the first sensing node 210_11 may be disposed inside the first capacitor 271_11 and the second sensing node 210_12 may be disposed inside the second capacitor 271_12. In this case, the number of at least one of the sensing nodes 210_11 to 210_NM may correspond to the number of at least one of the capacitors 271_11 to 271_NM.

Figure 7:
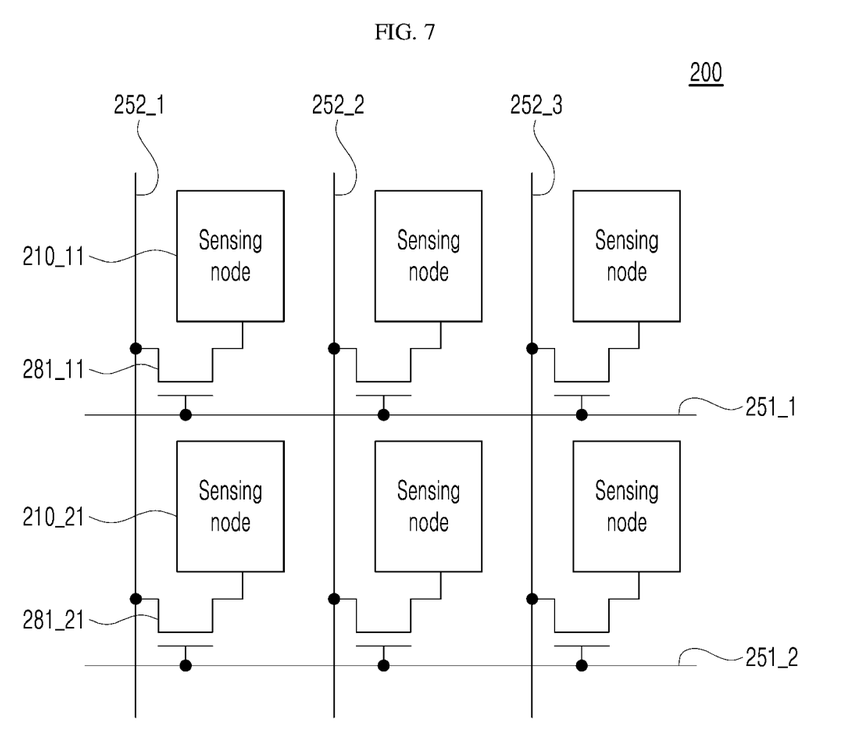
FIG. 7 is a view illustrating a second touch sensing unit of FIG. 1 according to still another embodiment in detail.

FIG. 7 is a view illustrating the second touch sensing unit 200 of FIG. 1 according to still another embodiment in detail.

Referring to FIG. 7, the second touch sensing unit 200 may include the at least one of first and second wires 251_1 to 251_N and 252_1 to 252_M, at least one of transistors 281_11 to 281_NM, and at least one of the sensing nodes 210_11 to 210_NM. At least one of the first and second wires 251_1 to 251_N and 252_1 to 252_M, at least one of the transistors 281_11 to 281_NM, and at least one of the sensing node 210_11 to 210_NM may be disposed on one surface of the second touch sensing unit 200 facing the first touch sensing unit 100.

In detail, at least one of the first wires 251_1 to 251_N may extend in the first direction and may be arranged in plurality in parallel to the second direction. Next, at least one of the second wires 252_1 to 252_M may extend in the second direction and may be arranged in plurality in parallel to the first direction.

Here, at least one of the first wires 251_1 to 251_N may correspond to the first direction and at least one of the second wires 252_1 to 252_M may correspond to the second direction. In this case, at least one of the first wires 251_1 to 251_N and one second wire (e.g., 252_2) of at least one of the second wires 252_1 to 252_M may be formed to have a structure perpendicular to each other.

Next, at least one of the transistors 281_11 to 281_NM may have a gate, a drain, and a source. The gate may be connected to at least one of the first wires 251_1 to 251_N, and one of the drain and source may be connected to at least one of the second wires 252_1 to 252_M. That is, at least one of the transistors 281_11 to 281_NM may be disposed in plural at a specific distance spaced apart in the first and second directions.

At least one of the sensing nodes 210_11 to 210_NM according to the embodiment may be disposed at another one of the drain and source of at least one of the transistors 281_11 to 281_NM. For example, when the drain of at least one of the transistors 281_11 to 281_NM are connected to at least one of the second wires 252_1 to 252_M, at least one of the sensing nodes 210_11 to 210_NM may be connected to the source of at least one of the transistors 281_11 to 281_NM. In this case, the number of at least one of the sensing nodes 210_11 to 210_NM may correspond to the number of at least one of the transistors 281_11 to 281_NM.

Figure 8:
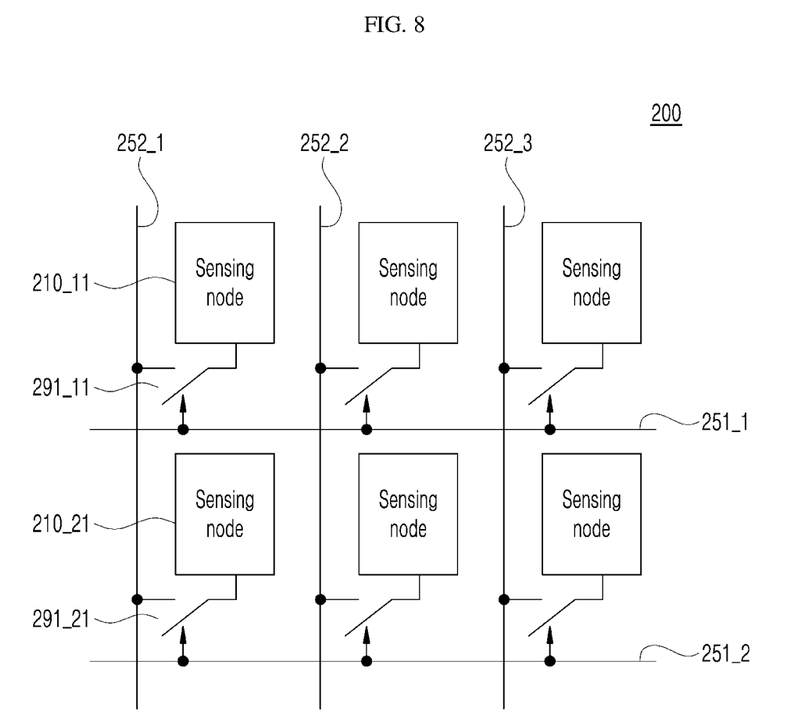
FIG. 8 is a view illustrating a second touch sensing unit of FIG. 1 according to still another embodiment in detail.

FIG. 8 is a view illustrating the second touch sensing unit 200 of FIG. 1 according to still another embodiment in detail.

Referring to FIG. 8, the second touch sensing unit 200 may include the at least one of first and second wires 251_1 to 251_N and 252_1 to 252_M, at least one of switches 291_11 to 291_NM, and at least one of the sensing nodes 210_11 to 210_NM. At least one of the first and second wires 251_1 to 251_N and 252_1 to 252_M, at least one of the switches 291_11 to 291_NM, and at least one of the sensing node 210_11 to 210_NM may be disposed on one surface of the second touch sensing unit 200 facing the first touch sensing unit 100.

In detail, at least one of the first wires 251_1 to 251_N may extend in the first direction and may be arranged in plurality in parallel to the second direction. Next, at least one of the second wires 252_1 to 252_M may extend in the second direction and may be arranged in plurality in parallel to the first direction.

Here, at least one of the first wires 251_1 to 251_N may correspond to the first direction and at least one of the second wires 252_1 to 252_M may correspond to the second direction. In this case, at least one of the first wires 251_1 to 251_N and one second wire (e.g., 252_2) of at least one of the second wires 252_1 to 252_M may be formed to have a structure perpendicular to each other.

Next, at least one of the switches 291_11 to 291_NM may have one side connected to one of at least one of the first wires 251_1 to 251_N and at least one of the second wires 252_1 to 252_M. Namely, the at least one of the switches 291_11 to 291_NM may be disposed in plural at a specific distance spaced apart in the first and second directions.

At least one of the sensing nodes 210_11 to 210_NM according to the embodiment may be disposed at the other side of at least one of the switches 291_11 to 291_NM. For example, the first sensing node 210_11 may be connected to the other side of the first switch 291_11, and the second sensing node 210_12 may be disposed at the other side of the second switch 291_21. In this case, the number of at least one of the sensing nodes 210_11 to 210_NM may correspond to the number of at least one of the switches 291_11 to 291_NM.

In addition, at least one of the switches 291_11 to 291_NM may connect at least one of the sensing nodes 210_11 to 210_NM to one of at least one of the first wires 251_1 to 251_N and at least one of the second wires 252_1 to 252_M through switching. For example, the at least one of the switches 291_11 to 291_NM may alternately connect at least one of the sensing nodes 210_11 to 210_NM to one of at least one of the first wires 251_1 to 251_N and at least one of the second wires 252_1 to 252_M based on the touch event detected by the first touch sensing unit 100.

Figure 9:
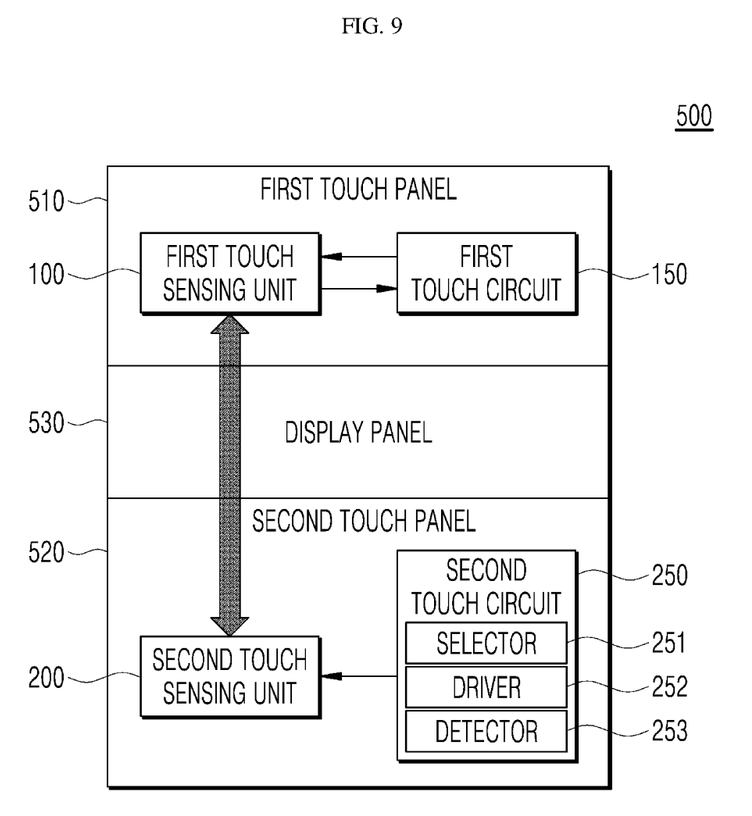
FIG. 9 is a diagram illustrating an example of a display device to which a touch sensor of FIG. 1 is applied.

FIG. 9 is a diagram illustrating an example of a display device 500 to which the touch sensor 10 of FIG. 1 is applied.

Referring to FIGS. 1 to 9, the display device 500 may include a first touch panel 510 on which the first touch sensing unit 100 is disposed and a second touch panel 520 on which the second touch sensing unit 200 is disposed, and a display panel 530. Hereinafter, duplicate descriptions of the first and second touch sensing units 100 and 200 of the same reference number described in FIG. 1 will be omitted.

First, the first touch panel 510 may be a substrate on which the first touch sensing unit 100 is disposed. Here, the first touch panel 510 may be formed of a flexible material. For example, the first touch panel 510 may include an X-axis ITO film, a driving line TS, a Y-axis ITO film, a sensing line RS, and the first touch sensing unit 100, which are disposed upward from the display panel 530. Namely, the first touch panel 510 may be a panel in which the X-axis ITO film, the driving line, the Y-axis ITO film, the sensing line, and the first touch sensing unit 100 are stacked.

In addition, the first touch panel 510 may further include a first touch circuit 150 for controlling the first touch sensing unit 100.

For example, the first touch circuit 150 may transmit a driving signal to the first touch sensing unit 100 connected through the driving line TS to drive the first touch sensing unit 100. In addition, the first touch circuit 150 may detect a sensing signal from the first touch sensing unit 100 connected through the sensing line RS to detect a user touch coordinate. Here, the driving line TS and the sensing line RS may include a plurality of wires which are separate from each other.

Next, the second touch panel 520 may be a substrate on which the second touch sensing unit 200 is disposed. Here, the second touch panel 520 may be formed of a flexible material. For example, the second touch panel 520 may include the second touch sensing unit 200, the at least one first wire, a Y-axis ITO film, the at least one second wire, and an X-axis ITO film, which are disposed downward from the display panel 530. Namely, the second touch panel 520 may be a panel in which the X-axis ITO film, the at least one second wire, the Y-axis ITO film, the at least one first wire, and the second touch sensing unit 200 are stacked.

In detail, the second touch panel 520 may further include a second touch circuit 250 for controlling the second touch sensing unit 200. In the inventive concept, although the second touch circuit 250 is described as a configuration included in the second touch panel 520, the second touch circuit 250 may be formed in an independent configuration disposed on the same plane as the second touch sensing unit 200 disposed on the second touch panel 520.

The second touch circuit 250 according to the embodiment may include a selector 251, a driver 252, and a detector 253. The selector 251 may select at least two or more node groups (e.g., 220_1 and 220_2) included in the second touch sensing unit 200 based on the user touch coordinate detected through the first touch circuit 150. Then, the driver 252 may transmit the driving signal to the at least two node groups 220_1 and 220_2 through one of at least one of the first and second wires. In addition, the detector 253 may detect the sensing signal from the at least two node groups (e.g., 220_1 and 220_2) through another one of at least one of the first and second wires.

For example, when the driver 252 transmits the driving signal from the at least two or more node groups (e.g., 220_1 and 220_2) through the at least one first wire, the detector 253 may detect the sensing signal from the at least two or more node groups (e.g., 220_1 and 220_2) through the at least one second wire.

According to an embodiment, the second touch circuit 250 may further include an amplifier. In detail, the amplifier may amplify the sensing signal transmitted through at least one of the first and second wires from the plurality of sensing nodes 210_11 to 210_NM in a linear or nonlinear manner to transmit an amplified signal to the detector 253. For example, the amplifier may be connected to at least one of the first and second wires and may include at least one of a buffer, an amplifier, a single-ended amplifier, and a transistor.

Next, the display panel 530 may be disposed between the first and second touch panels 510 and 520 and perform a function of displaying an image. To this end, the display panel may include a plurality of pixels. Here, optical clear adhesives 20, 40, and 60 may be formed between the display panel 530 and the first touch panel 510 and between the display panel 530 and the second touch panel 520.

In detail, the plurality of pixels may emit light with a specific color. For example, the pixels may emit red, green, blue, and the like. The display panel 530 may further include driving circuits for controlling the pixels.

That is, the second touch panel 520 may be disposed below the first touch panel 510 based on the display panel 530. In detail, the first touch panel 510 may be disposed above the display panel 530, and the second touch panel 520 may be disposed below the display panel 530. In this case, the plurality of coils 110_11 to 110_NM of the first touch panel 510 and the plurality of sensing nodes 210_11 to 210_NM of the second touch panel 520 may be wirelessly coupled to each other in a coupling manner.

The touch sensor with the modular form and the display device including the same according to an embodiment of the inventive concept may reduce the sensing and driving limit problem caused by the increase in the size of the touch panel.

In addition, the touch sensor may be configured in the unit of the module type corresponding to each node group, thereby increasing manufacturing yield and reducing manufacturing cost.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A touch sensor comprising:
   a first touch sensing unit including a plurality of coils arranged in first and second directions; and
   a second touch sensing unit including a plurality of sensing nodes arranged in the first and second directions to wirelessly couple the plurality of coils in a one-to-one correspondence,
   wherein the first touch sensing unit formed on a first touch panel is stacked above the second touch sensing unit formed on a second touch panel, and
   wherein the plurality of sensing nodes formed on the second touch panel are grouped into at least two node groups based on a touch event detected by the first touch sensing unit.

2. The touch sensor of claim 1, wherein the second touch sensing unit includes:
   at least one first wire extending in the first direction and formed in a rod shape;
   at least one second wire extending in the second direction and formed in the rod shape; and
   at least one sensing node arranged for each arrangement region where the at least one first and second wires cross each other.

3. The touch sensor of claim 1, wherein the second touch sensing unit includes:
   at least one first wire in which at least one first sub-coil is disposed at a specific distance spaced apart from each other in the first direction;
   at least one second wire in which at least one second sub-coil is disposed a specific distance spaced apart from each other in the second direction; and
   at least one sensing node arranged for each second arrangement region formed by a pair of first sub-coils of the at least one first sub-coil and a pair of second sub-coils of the at least one second sub-coil,
   wherein the second arrangement region corresponds to an outer region of the at least one of first and second wires.

4. The touch sensor of claim 1, wherein the second touch sensing unit includes:
   at least one first wire in which at least one first sub-coil is disposed at a specific distance spaced apart from each other in the first direction;
   at least one second wire in which at least one second sub-coil is disposed a specific distance spaced apart from each other in the second direction; and
   at least one sensing node arranged for each third arrangement region formed by a pair of first sub-coils of the at least one first sub-coil and a pair of second sub-coils of the at least one second sub-coil,
   wherein the third arrangement region corresponds to an region where the at least one first wire and the one second wire cross each other and overlap each other.

5. The touch sensor of claim 1, wherein the second touch sensing unit includes:
- at least one first wire in which at least one first sub-coil is disposed at a specific distance spaced apart from each other in the first direction;
- at least one second wire in which at least one second sub-coil is disposed a specific distance spaced apart from each other in the second direction; and
- at least one sensing node arranged between the first sub-coil and the second sub-coil.

6. The touch sensor of claim 1, wherein the second touch sensing unit includes:
- at least one first wire extending in the first direction;
- at least one second wire extending in the second direction;
- at least one capacitor having one side connected to the at least one first wire and the other side connected to the at least one second wire; and
- at least one sensing node disposed in the capacitor;
- wherein the number of capacitors corresponds to the number of at least one sensing node.

7. The touch sensor of claim 1, wherein the at least two node groups comprise first and second node groups based on the touch event detected by the first touch sensing unit.

8. The touch sensor of claim 7, wherein the first and second node groups include first and second arrangement connected to each other by at least one first wire corresponding to the first direction, and
- wherein each of the first and second arrangement includes at least one sensing node connected to each other by at least one second wire corresponding to the second direction and the remaining sensing nodes not connected to each other by the at least one second wire.

9. The touch sensor of claim 1, wherein the second touch sensing unit includes:
- at least one first wire extending in the first direction;
- at least one second wire extending in the second direction;
- at least one transistor having a gate connected to the at least one first wire, and one of a source and a drain connected to the at least one second wire; and
- at least one sensing node connected to another one of the source and the drain of the transistor.

10. The touch sensor of claim 9, wherein the number of at least one transistor corresponds to the number of at least one sensing node.

11. The touch sensor of claim 1, wherein the second touch sensing unit includes:
- at least one first wire extending in the first direction;
- at least one second wire extending in the second direction;
- at least one switch having one side connected to one of the at least one of first and second wires through switching; and
- at least one sensing node connected to the other side of the at least one switch.

12. The touch sensor of claim 11, wherein the number of at least one switch corresponds to the number of at least one sensing node.

13. The touch sensor of claim 11, wherein the at least one switch alternately connects the at least one sensing node to the at least one first wire and the at least one second wire through switching.

14. A display device comprising:
- a first touch panel on which a first touch sensing unit including a plurality of coils is disposed;
- a second touch panel on which a second touch sensing unit including a plurality of sensing nodes is disposed, each sensing node being arranged to wirelessly couple the plurality of coils in a one-to-one correspondence; and
- a display panel disposed between the first and second touch panels and configured to display an image,
- wherein the first touch panel is a panel stacked above the display panel and the second touch panel is a panel stacked below the display panel, and
- wherein the plurality of sensing nodes formed on the second touch panel are grouped into at least two node groups including first and second node groups based on a touch event detected by the first touch sensing unit.

15. The display device of claim 14, wherein the display panel is disposed between the first and second touch panels and comprises a plurality of pixels to perform a function of displaying an image.

16. The display device of claim 14, wherein the plurality of coils are arranged on one surface of the first touch panel in first and second directions, and
- wherein the plurality of sensing nodes are arranged on one surface of the second touch panel in the first and second directions.

17. The display device of claim 16, wherein the first and second node groups include first and second arrangements connected to each other by at least one first wire corresponding to the first direction, and
- wherein each of the first and second arrangements includes at least one sensing node connected to each other by at least one second wire corresponding to the second direction and the remaining sensing nodes not connected to each other by the at least one second wire.

18. The display device of claim 17, further comprising:
- a touch circuit connected from the plurality of sensing nodes through the at least one of the first and second wires,
- wherein the touch circuit is disposed on the same surface as the second touch panel.

19. The display device of claim 18, wherein the touch circuit includes:
- a selector configured to select at least two node groups based on the touch event detected by the first touch sensing unit;
- a driver configured to transmit a driving signal to the at least two node groups; and
- a detector configured to detect a sensing signal from the at least two node groups.

20. The display device of claim 19, wherein the touch circuit further includes an amplifier configured to amplify the sensing signal transmitted from the plurality of sensing nodes through the first and second wires in a linear or nonlinear manner to transmit an amplified signal to the sensor, and
- wherein the amplifier includes at least one of a buffer, an amplifier, a single-ended amplifier, and a transistor.

* * * * *